(12) United States Patent
Moore

(10) Patent No.: US 9,183,494 B2
(45) Date of Patent: Nov. 10, 2015

(54) COMPETITIVE BCM LEARNING RULE FOR IDENTIFYING FEATURES

(75) Inventor: Douglas A. Moore, San Diego, CA (US)

(73) Assignee: The Intellisis Corporation, San Diego, CA (US)

( * ) Notice: Subject to any disclaimer, the term of this patent is extended or adjusted under 35 U.S.C. 154(b) by 495 days.

(21) Appl. No.: 12/853,939

(22) Filed: Aug. 10, 2010

(65) Prior Publication Data
US 2011/0270789 A1 Nov. 3, 2011

Related U.S. Application Data

(60) Provisional application No. 61/329,749, filed on Apr. 30, 2010.

(51) Int. Cl.
G06N 3/08 (2006.01)
G06N 3/10 (2006.01)

(52) U.S. Cl.
CPC ... *G06N 3/08* (2013.01); *G06N 3/10* (2013.01)

(58) Field of Classification Search
None
See application file for complete search history.

(56) References Cited

U.S. PATENT DOCUMENTS 8,005,773 B2 * 8/2011 Ananthanarayanan et al. 706/15

OTHER PUBLICATIONS

Blais, "Plasticity, A Synaptic Modification Simulation Environment", http://web.bryant.edu/~bblais/plasticity, version 7, 2004, pp. 1-24.*

Leon Cooper, Conference Slides titled: "Towards a Cellular and Molecular Basis for Memory: Theory and Experiment", Sixth International Symposium on Frontiers of Fundamental Physics, Udine, Italy, Sep. 2004, slides 1-108.*

Cooper, Scofield, "Mean-field theory of a neural network", Proceedings of the National Academy of Sciences, vol. 85, Mar. 1988, pp. 1973-1977.*

Bienenstock, Coooper, Munro, "Theory for the Developent of Neuron Selectivity: Orientation Specificity and Binocular Interaction in Visual Cortex", The Journal of NeuroScience, vol. 2, No. 1, Jan. 1982, pp. 32-48.*

Intrator, "Feature Extraction Using an Unsupervised Neural Network", Office of Naval Research, Technical Report #56, AD-A235581, Washington, DC, 1991, pp. 1-10.*

Jose M. Jerez, Miguel Atencia, Francisco J. Vico, and Enrique Dominguez, "A learning rule to model the development of orientation selectivity in visual cortex", Computational Methods in Neural Modeling, Lecture Notes in Computer Science vol. 2686, 2003, pp. 190-197.*

(Continued)

*Primary Examiner* — Kakali Chaki
*Assistant Examiner* — Walter Hanchak
(74) *Attorney, Agent, or Firm* — Edell, Shapiro & Finnan, LLC

(57) ABSTRACT

Disclosed are systems, apparatuses, and methods for implementing a competitive BCM learning rule used in a neural network. Such a method includes identifying a maximally responding neuron with respect to a feature of an input signal. The maximally responding neuron is the neuron in a group that has a response with respect to the feature of the input signal that is greater than a response of each other neuron in the group. Such a method also includes applying a learning rule to weaken the response of each other neuron with respect to the feature of the input signal. The learning rule may also strengthen the response of the maximally responding neuron with respect to the feature of the input signal.

12 Claims, 6 Drawing Sheets

(56) References Cited

OTHER PUBLICATIONS

Brian S. Blais, N. Intrator, H. Shouval, Leon N Cooper, "Receptive field formation in natural scene environments: comparison of single cell learning rules", Neural Computation 10, 1998, pp. 1797-1813.*

John Hertz, Anders Krogh, Richard G. Palmer, Chapter 9, sections 9.1 and 9.2 of Introduction to the Theory of Neural Computation, Lecture Notes vol. I, Santa Fe Institute Studies in the Sciences of Complexity, Addison-Wesley Publishing Company, Redwood City, CA, 1991, pp. 217-228.*

Nathon Intrator, "Feature Extraction Using an Unsupervised Neural Network", Neural Computation, 4:98 107, 1992, pp. 1-10.*

Intrator and Cooper, "Objective Functon Formulation of the BCM Theory of Visual Cortical Plasticity: Statistical Connections, Stability Conditions", Neural Networks, vol. 5, 1992, pp. 3-17.*

G C Castellani, N Intrator, H Shouval and L N Cooper, "Solutions of the BCM learning rule in a network of lateral interacting nonlinear neurons", Comput. Neural Syst. 10, 1999, pp. 111-121.*

F. J. Vico and J. M. Jerez, "Stable Neural Attractors Formation: Learning Rules and Network Dynamnics", Neural Processing Letters, vol. 18, 2003, pp. 1-16.*

\* cited by examiner

COMPETITIVE BCM LEARNING RULE FOR IDENTIFYING FEATURES

CROSS REFERENCE TO RELATED APPLICATIONS

This application claims benefit under 35 U.S.C. §119(e) to U.S. Provisional Application No. 61/329,749 to Moore, entitled "Competitive BCM Learning Rule for Identifying Features," filed Apr. 30, 2010, which is incorporated by reference herein in its entirety.

This application is related to U.S. Provisional Application No. 61/329,401 to Shalom, entitled "Modified BCM Learning Rule for Identifying Clusters," filed Apr. 29, 2010, which is incorporated by reference herein in its entirety.

BACKGROUND OF THE INVENTION

1. Field of the Invention

The present invention is generally directed to neural networks. More particularly, the present invention is directed to learning in neural networks.

2. Background Art

Neural networks attempt to achieve autonomous behavior based on a network of simulated neurons that are connected in a manner suggestive of connections between real neurons in humans. In humans, a first neuron may fire in response to an external stimulus. In response to the firing of the first neuron, other neurons connected to the first neuron may also fire.

Similarly, a first simulated neuron in an input layer of a neural network can become active (e.g., fire) in response to stimulus to the neural network. One or more simulated neurons connected to the first simulated neuron may become active (e.g., fire) in response to the activity (e.g., firing) of the first neuron. Whether the activity of the first simulated neuron causes other simulated neurons to become active is dependent on at least two factors: (i) a weight associated with a connection between the first simulated neuron and each other simulated neuron to which the first simulated neuron is connected; and (ii) the threshold activity level required to cause each other simulated neuron to become active.

To train the neural network (i.e., to cause the neural network to behave in a desired way), the weight associated with each connection is adjusted in response to different types of stimuli. A learning rule is the rule applied to determine how the weight changes during each time step.

A well-known learning rule is called the BCM learning rule, after Bienenstock, Cooper, and Munro who introduced this rule in 1982. See Bienenstock, E. L., Cooper, L. N, and Munro, P. W, "Theory for the Development of Neuron Selectivity: Orientation Specificity and Binocular Interaction in Visual Cortex," *Journal of Neuroscience*, 2:32-48 (1982), the entirety of which is hereby incorporated by reference herein.

A drawback of the conventional BCM learning rule is that it may cause multiple neurons of a neural network to respond to the same feature of an input signal. As a result, another interesting feature of the input signal may not be responded to by any neurons of the neural network.

Given the foregoing, what is desired are systems, apparatuses, and methods for implementing a neural network that uses an improved learning rule.

BRIEF SUMMARY OF EMBODIMENTS OF THE INVENTION

The present invention meets the above-described needs by providing systems, apparatuses, articles of manufacture, and methods for implementing a competitive learning rule used in a neural network.

For example, an embodiment of the present invention provides a computer-implemented method that includes identifying a maximally responding neuron with respect to a feature of an input signal. The maximally responding neuron is the neuron in a group that has a response with respect to the feature of the input signal that is greater than a response of each other neuron in the group. This computer-implemented method also includes applying a learning rule to weaken the response of each other neuron with respect to the feature of the input signal. The learning rule may also strengthen the response of the maximally responding neuron with respect to the feature of the input signal.

Another embodiment of the present invention provides a computer-program product including a computer-readable storage medium having instructions stored thereon that, if executed by a computing device, cause the computing device to perform the above-described method.

A further embodiment of the present invention provides a computing system for implementing a competitive learning rule for updating weights in a neural network. The computing system includes a memory and a processing unit. The memory is configured to store a plurality of neurons. The processing unit is configured to (i) determine a response of each of the plurality of neurons with respect to a feature of an input signal and (ii) update a weight of a connection to each respective neuron based on the response of each respective neuron with respect to the feature of the input signal. A first learning rule is applied to update the weight connecting to a maximally responding neuron of the plurality of neurons, wherein the maximally responding neuron is the neuron having the maximum response to the feature of the input signal. A second learning rule is applied to update the weight connecting to each other neuron that is not the maximally responding neuron.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
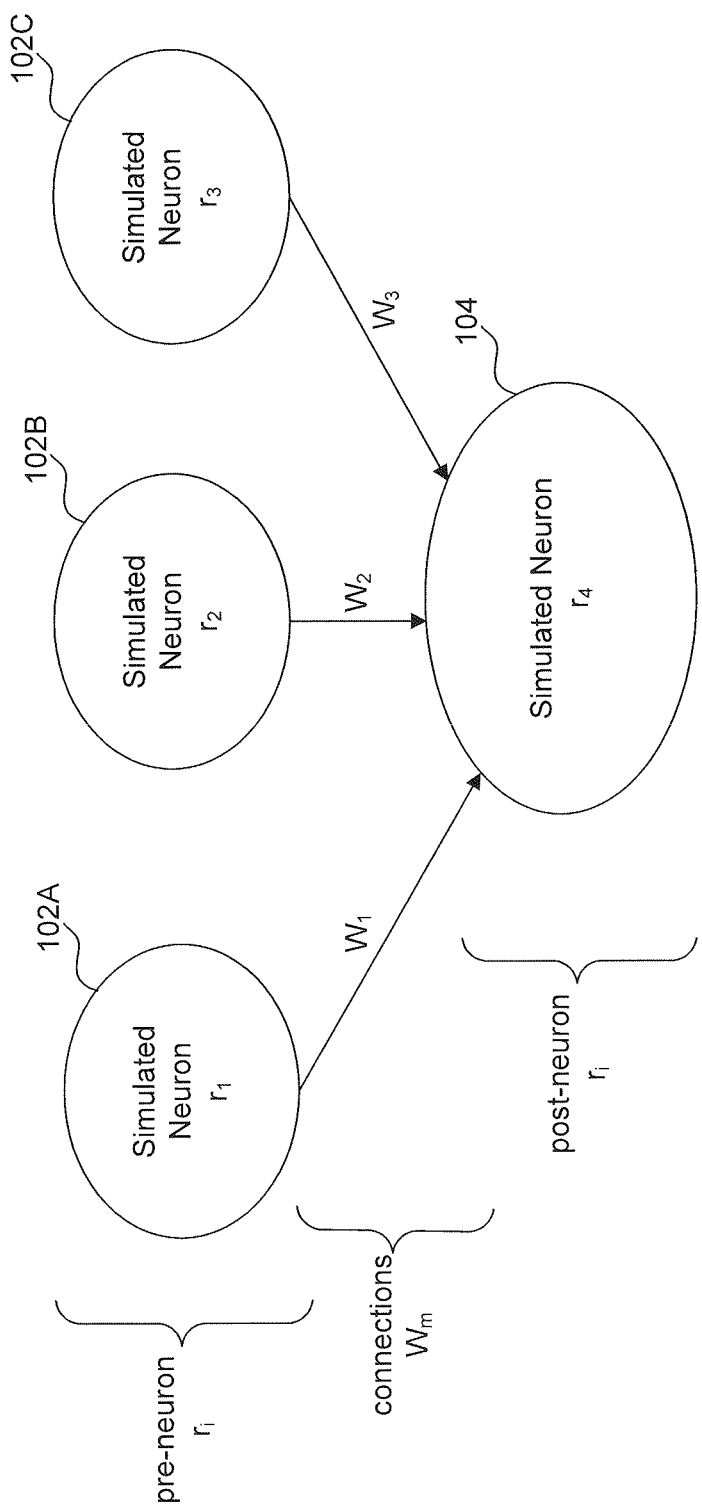
FIG. 1 illustrates an example neural anatomy in which three pre-neurons are connected to one post-neuron.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview of Embodiments of the Invention

Embodiments of the present invention include systems, apparatuses, and methods for providing a competitive BCM learning rule for identifying features, and applications thereof. As used herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, it would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

An embodiment of the present invention provides a method for implementing a competitive BCM learning rule. The competitive BCM learning rule is applied differently depending on whether a neuron is the maximally responding neuron with respect to a particular feature of an input signal. The maximally responding neuron is the neuron in a group that has the maximum response to a particular feature of an input signal.

For the maximally responding neuron, the standard BCM learning rule is applied to connections leading to the maximally responding neuron. In this way, the maximally responding neuron is configured to continue responding to that particular feature in the input signal.

For all other neurons that are NOT the maximally responding neuron, a modified learning rule is applied to connections leading to these neurons. The modified learning rule weakens the response of the neuron with respect to the particular feature. In this way, the neuron is configured to respond to a different feature in the input signal.

Thus, the competitive BCM learning rule may prevent multiple neurons from responding to the same feature in an input signal. Consequently, each neuron of a neural network that implements a competitive BCM learning rule in accordance with an embodiment of the present invention may be configured to respond to a unique feature of an input signal.

Before providing additional details of the competitive BCM learning rule in accordance with embodiments of the present invention, it is first helpful to disclose concepts underlying neural networks.

II. Neural Networks

A. Basic Concepts of Neural Networks

A neural network comprises a set of discrete elements—neurons—that are connected to one another. Each neuron is typically connected to a fraction of all the neurons in the network. Associated with each neuron and connection is a set of states and parameters which are potentially changing with time.

FIG. 1 illustrates a very simple example of a neural network. In the example of FIG. 1, three neurons 102A-C (referred to as pre-neurons) are connected to one neuron 104 (referred to as a post-neuron). Mathematically, the set of states and parameters for each pre-neuron 102 and post-neuron 104 is described by a vector, $\vec{r}_j$, where the subscript identifies the particular neuron. For the example of FIG. 1, the index j runs from 1 to 4 because there are four neurons—i.e., three pre-neurons 102 and one post-neuron 104.

Similarly, each connection is described by a vector $\vec{w}_k$, where the subscript k identifies the connection. For the example of FIG. 1, the index k runs from 1 to 3 because there are three distinct connections—i.e., one connection from pre-neuron 102A to post-neuron 104, one connection from pre-neuron 102B to post-neuron 104, and one connection from pre-neuron 102C to post-neuron 104. In a neural network, each connection is directed. This means, for each connection, one neuron is designated as the start of the connection and the other neuron is the terminal for the connection. The start neuron for a given connection is called a pre-synaptic neuron (or pre-neuron) and the terminal for a given connection is called the post-synaptic neuron (or post-neuron).

III. Example System for Neural Simulation

A. Example Computer System and Software Implementation

Figure 2:
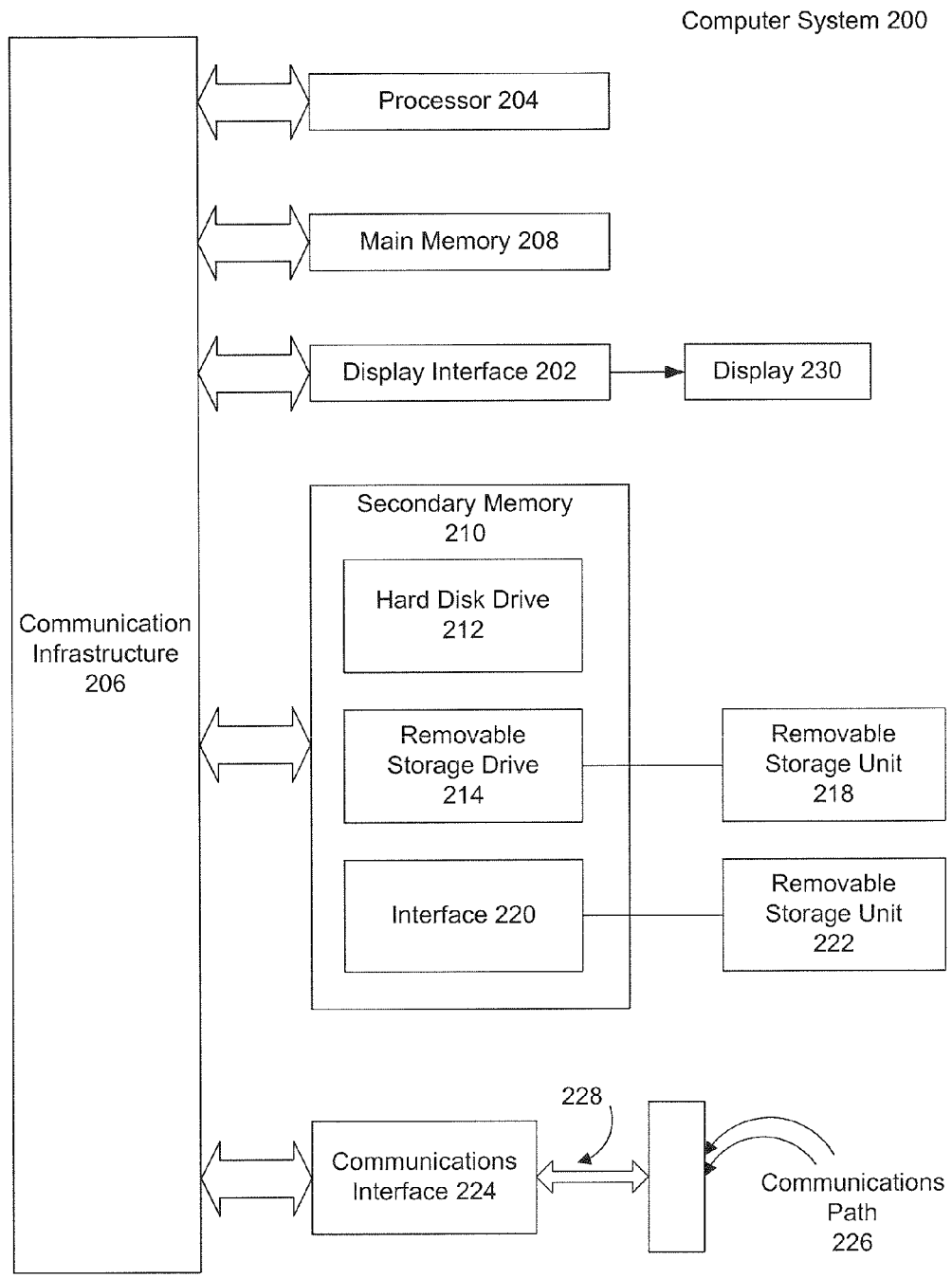
FIG. 2 illustrates an example computer system in accordance with an embodiment of the present invention.

Various aspects of the present invention-such as a competitive BCM learning rule—can be implemented by software, firmware, hardware, or a combination thereof. FIG. 2 illustrates an example computer system 200 in which an embodiment of the present invention, or portions thereof, can be implemented as computer-readable code. Various embodiments of the invention are described in terms of this example computer system 200. After reading this description, it will become apparent to a person skilled in the relevant art how to implement the invention using other computer systems and/or computer architectures.

Computer system 200 includes one or more processors, such as processor 204. Processor 204 can be a special-purpose or a general-purpose processor. Processor 204 is connected to a communication infrastructure 206 (for example, a bus or network).

Computer system 200 includes a display interface 202. Display interface 202 is coupled to a display device 230 (such as, a liquid-crystal display, a cathode-ray tube display, a plasma screen display, or some other type of display).

Computer system 200 also includes a main memory 208, preferably random access memory (RAM), and may also include a secondary memory 210. Secondary memory 210 may include, for example, a hard disk drive 212 and/or a removable storage drive 214. Removable storage drive 214 may comprise a floppy disk drive, a magnetic tape drive, an optical disk drive, a flash memory, or the like. The removable storage drive 214 reads from and/or writes to a removable storage unit 218 in a well known manner. Removable storage unit 218 may comprise a floppy disk, magnetic tape, optical disk, etc. which is read by and written to by removable storage drive 214. As will be appreciated by persons skilled in the relevant art(s), removable storage unit 218 includes a computer-readable storage medium having stored therein computer software and/or data.

In alternative implementations, secondary memory 210 may include other similar means for allowing computer programs or other instructions to be loaded into computer system 200. Such means may include, for example, a removable storage unit 222 and an interface 220. Examples of such means may include a program cartridge and cartridge interface (such as that found in video-game devices), a removable memory chip (such as an EPROM, or PROM) and associated socket, and other removable storage units 222 and interfaces 220 which allow software and data to be transferred from the removable storage unit 222 to computer system 200.

Computer system 200 may also include a communications interface 224. Communications interface 224 allows software and data to be transferred between computer system 200 and external devices. Communications interface 224 may include a modem, a network interface (e.g., an Ethernet card), a communications port, a PCMCIA slot and card, or the like. Software and data transferred via communications interface 224 are in the form of signals 228 which may be electronic, electromagnetic, optical, or other signals capable of being received by communications interface 224. These signals 228 are provided to communications interface 224 via a communications path 226. Communications path 226 carries signals 228 and may be implemented using wire or cable, fiber optics, a phone line, a cellular phone link, an RF link or other communications channels.

In this document, the terms "computer program medium" and "computer-readable storage medium" are used to generally refer to media or other articles of manufacture such as removable storage unit 218, removable storage unit 222, and a hard disk installed in hard disk drive 212. Computer-program medium and computer-readable storage medium can also refer to memories, such as main memory 208 and secondary memory 210, which can be memory semiconductors (e.g., DRAMs, etc.). These computer-program products are means for providing software to computer system 200.

Computer programs (also called computer control logic) are stored in main memory 208 and/or secondary memory 210. Computer programs may also be received via communications interface 224. Such computer programs, when executed, enable computer system 200 to implement embodiments of the present invention as discussed herein, such as neural simulations as described above. Accordingly, such computer programs represent controllers of the computer system 200. Where embodiments of the invention are implemented using software, the software may be stored in a computer program product and loaded into computer system 200 using removable storage drive 214, interface 220, hard drive 212 or communications interface 224.

B. Configuration of Computer System for Neural Simulations

Figure 3:
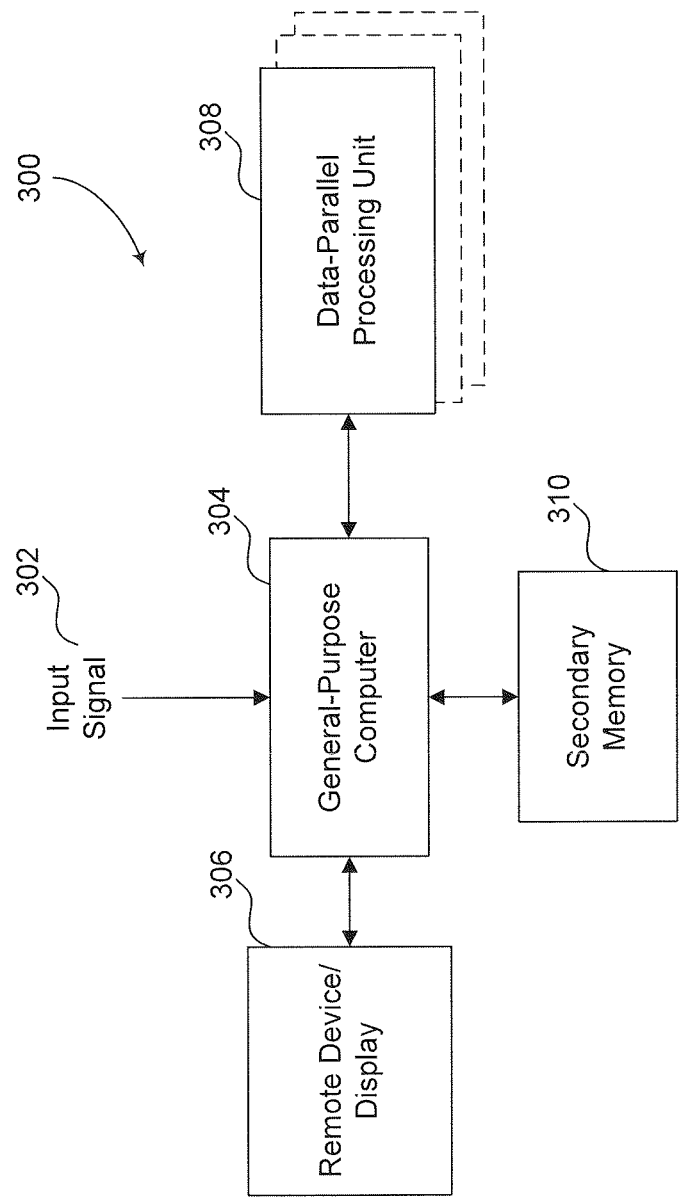
FIG. 3 illustrates a more-detailed example computer system for implementing a neural simulation in accordance with an embodiment of the present invention.

FIG. 3 illustrates an example system 300 for implementing a neural simulation in accordance with an embodiment of the present invention. Referring to FIG. 3, system 300 includes a general-purpose computer 304, a remote device (display) 306, a secondary memory 310, and a data-parallel processing unit 308.

General-purpose computer 304 performs input/output functions of system 300. To perform these functions, general-purpose computer 304 comprises typical components of a general-purpose computer-such as, for example, a memory and general-purpose processor. General-purpose computer 304 is coupled to remote device (display) 306, data-parallel processing unit 308, and secondary memory 310. An input signal 302 (e.g., a video signal, audio signal, or some other input signal) is provided to general-purpose computer 304.

Remote device (display) 306 enables an administrator to interact with system 300. Remote device 306 may simply comprise a monitor and keyboard to enable a user to interact with general-purpose computer 304. Alternatively, remote device 306 may comprise a computing device (e.g., laptop computer, desktop computer, hand-held device, or the like) that is coupled to general-purpose computer 304 via a network connection (e.g., a local area network (LAN) connection, an Internet connection, or the like). Remote device 306 may be used by an administrator to set up a neural simulation. For example, the administrator may provide a network-description file or other inputs as described in more detail below. Additionally, remote device 306 enables an administrator to monitor the progress of a neural simulation that may run on system 300. For example, if input signal 302 is a video signal, general-purpose computer 304 may cause input signal 302 to be displayed on remote device 306 to enable an administrator to evaluate whether system 300 is properly functioning to identify entities (e.g., objects) included in the video signal. As another example, if input signal 302 is an audio signal, general-purpose computer 304 may cause input signal 302 to be played on remote device 306 to enable an administrator to evaluate whether system 300 is properly functioning to identify entities (e.g., sound sources) included in audio signal.

Secondary memory 310 stores algorithms (e.g., neural simulations) to be executed by system 300 and also stores instances of simulated neural (which may be stored as memory arrays). Secondary memory 310 may comprise, for example, a hard disk drive or a removable storage drive (e.g., floppy disk drive, magnetic tape drive, an optical disk drive, a flash drive, etc.).

Data-parallel processing unit 308 performs computations to implement a neural simulation in accordance with an embodiment of the present invention. In an embodiment, data-parallel processing unit 308 comprises one or more off-the-shelf graphics processing units (GPUs)—such as but not limited to, for example, three general-purpose GPUs provided by NVIDIA Corporation of Santa Clara, Calif. ("NVIDIA"). In another embodiment, data-parallel processing unit 308 comprises one or more custom-made processing units, in an embodiment specifically configured to process neural-simulation data.

Data-parallel processing unit 308 is connected to general-purpose computer 304. The connection between data-parallel processing unit 308 and general-purpose computer 304 may comprise a peripheral component interconnect (PCI), a PCI express (PCIe), or some other type of connection. Data-parallel processing unit 308 communicates with general-purpose computer 304 via an application-programming interface (API). The API allows an administrator to program data-parallel processing unit 308 to perform functions of a neural simulation in accordance with an embodiment of the present invention. If data-parallel processing unit 308 comprises a custom-made processing unit, then a custom-made API is used. If, on the other hand, data-parallel processing unit 308 comprises one or more off-the-shelf GPUs, then either a custom-made or commercially available API can be used. Several types of commercially available APIs for programming off-the-shelf GPUs currently exist-including but not limited to, for example, DirectX® developed by Microsoft Corporation of Redmond, Washington; OpenGL® developed by Silicon Graphics, Inc. of Sunnyvale, Calif.; and Compute Unified Device Architecture (CUDA) developed by NVIDIA. For commercially available APIs, the API typically communicates with a driver. The driver translates standard code received from the API into a native format of instructions understood by the off-the-shelf GPU. The driver is typically written by the manufacturer of the off-the-shelf GPU. The GPU then executes the instructions from the driver.

IV. Example Operation of Neural Simulation

Figure 4:
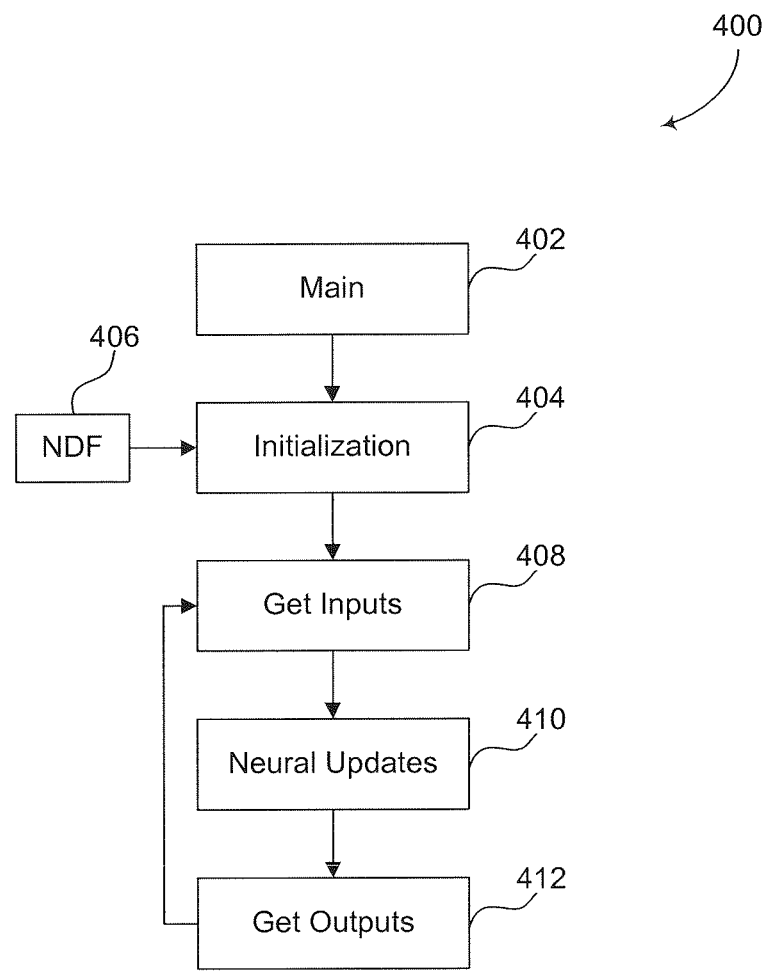
FIG. 4 illustrates an example process for implementing a neural simulation in accordance with an embodiment of the present invention.

FIG. 4 illustrates steps of an example neural simulation 400 performed by a neural network in accordance with an embodiment of the present invention. Neural simulation 400 may be implemented, for example, on the hardware components of system 300 of FIG. 3 as explained in greater detail below.

Referring to FIG. 4, neural simulation 400 begins at a step 402 in which a main function is called. The algorithm used to implement neural simulation 400 may be stored, for example, in secondary memory 310 of system 300. Calling the main function, as illustrated in step 402, may load this algorithm (or a portion thereof) into the local memory of general-purpose computer 304 in preparation for the execution of neural simulation 400.

In a step 404, neural simulation 400 is initialized based on groups and projections defined in a network-description file 406. A group defines a collection of simulated neurons. A projection defines how simulated neurons are to be connected.

Network-description file 406 specifies features of each group of simulated neurons. These features are implemented during the initialization of step 406. As would be understood by persons skilled in the art, the features specified by network-description file 406 may include, but are not limited to, the following:

Height—the number of simulated neurons included in the neural group along a first (e.g., vertical) dimension;

Width—the number of simulated neurons included in the neural group along a second (e.g., horizontal) dimension;

Firing threshold—an overall activity level that must be received by a simulated neuron in order to cause the simulated neuron to become active;

Phase threshold—an activity level that must be received by a simulated neuron in order to cause the simulated neuron to choose a phase; otherwise, the phase is set randomly;

Voltage-dependent threshold—an activity level that must be collectively provided by all voltage-independent inputs to a simulated neuron in order for voltage-dependent inputs to contribute to the activity of the simulated neuron; and Persistence—a duration over which a simulated neuron remains active. It is to be appreciated that these features are presented for illustrative purpose only, and not limitation. Other features of a neural group may be specified in network-description file 406.

In addition to neural groups, network-description file 406 specifies projections between neural groups. The projections define how the simulated neurons of the different neural groups will connect to each other during the initialization of step 404. As would be understood by persons skilled in the art, network-description file 406 may specify, for example, the following features of each projection:

from neural group—the simulated group of neurons from which a connection emanates;

to neural group—the simulated group of neurons to which a connection is made;

probability—the probability that a connection will be created between a from neuron and a to neuron during initialization;

influence—a weighting factor for a particular connection;

maximum initial weight—the maximum initial weight between a from neuron and a to neuron;

minimum initial weight—the minimum initial weight between a from neuron to a to neuron;

connection type—the type of connection (e.g., voltage-dependent or voltage-independent) between a from neuron and a to neuron;

phase-dependent—the phase-dependency of a connection (e.g., phase-independent or phase-dependent)

learning rule—the transfer function between a from neuron and a to neuron; and learning rate—a parameter that governs how quickly a connection strength between a from neuron and a to neuron can change over time.

It is to be appreciated, however, that the features of neural projections presented above are presented for illustrative purposes only, and not limitation. Other features of neural projections may be included in network-description file 406.

Referring again to FIG. 4, after the initialization step 404 is performed, inputs to simulation 400 are obtained, as illustrated in a step 408. The inputs refer to the activity and phase of each simulated neuron used in a neural simulation. Initially, the activity and phase of simulated neurons is set based on an input signal. In an embodiment, the I/O functions required to get the inputs of step 408 are performed by general-purpose computer 304. For example, get-inputs step 408 may be performed by general-purpose computer 304 when it receives an input signal and provides the input signal to data-parallel processing unit 308.

In a step 410, neural updates are computed. That is, a new activity and phase are computed for each simulated neuron. The new activity and phase of a first simulated neuron is based on the activities and phases of other simulated neurons connected to the first simulated neuron. An example method for updating the activity and phase of a simulated neuron is presented in U.S. application Ser. No. 12/621,243 to Moore et al., entitled "Neural Segmentation of an Input Signal and Applications Thereof, filed Nov. 18, 2009, the entirety of which is hereby incorporated by reference herein. In an embodiment, the neural updates of step 410 are computed by data-parallel processing unit 308.

In a step 412, results of the neural updates are obtained. For example, general-purpose computer 304 may obtain the results of the neural updates performed by data-parallel processing unit 308 during step 410.

After step 412, neural simulation 400 may loop back to step 408. In an embodiment, steps 408, 410, and 412 represent one simulation cycle of neural simulation 400.

V. Learning Rules in Neural Networks

As mentioned above, a neural network is trained by adjusting the respective weights between connections of the neural network. A learning rule is the rule used to specify how the connections change after each time step of a neural simulation. Described below is (A) the conventional BCM learning rule and (B) a competitive BCM learning rule in accordance with an embodiment of the present invention.

A. Conventional BCM Learning Rule

The BCM learning rule is configured to respond to input data to find independent or distinct components of the input data. Learning in a neural network is designed to look for features that are present in the input data. The strength of the response is proportional to the frequency of features in the input data. The frequency and strength of the features are important in the learning process used by the BCM learning rule. The BCM learning rule changes weights in proportion to the activity of the input neuron and the activity of the output neuron. A mathematical exposition of the BCM learning rule is provided below.

The information-processing properties of neurons, in a much simplified form, can be summarized by the following input-output relations, for K-dimension space:

$$y = \sigma\left(\sum_{i=0}^{K-1} w_i x_i\right) = \sigma(w^T \cdot x) \quad \text{(Eq. 1)}$$

wherein $x_i$ and $w_i$ are the input and synaptic weight from the i-th incoming synaptic cell, respectively, y is the cell output, and $\sigma(x)$ an (optional) output modifying function, usually a non-linear sigmoid function.

Given this mathematical description of the inputs, outputs, and synaptic weights, the BCM learning rule can be written generally as $$\Delta w_i = \eta * \Phi(y, \theta_M) * x_i \quad \text{(Eq. 2)}$$

where, $\eta$ is a learning rate, and the modification threshold $\theta_M$ is defined as follows $$\theta_M = E[y^2] \quad \text{(Eq. 3)}$$

and $$\Phi(y, \theta_M) = y(y - \theta_M)\sigma'(y)$$

and E(x) is the expected value, and $\sigma'(x)$ is the derivative of $\sigma(x)$ with respect to x. In order to have stable fixed points, the average used for the modification threshold is calculated with the square of the output, $E[y^2]$, not $E_2[y]$, which has only trivial stable fixed points for zero mean input. The average used for the threshold is assumed to be an average over all input patterns, although a temporal average is usually equivalent.

This form of the BCM learning rule can be derived by maximizing the following objective function $$R(y) = \frac{1}{3}E[y^3] - \frac{1}{4}E^2[y^2] \quad \text{(Eq. 5)}$$

which measures the sparseness or bi-modality of the output distribution. Similar rules can be derived from objective functions based on kurtosis and skewness, although not all of them have the stability properties of this one. (See Cooper, L. N, Intrator, N., Blais, B. S., and Shouval, H. Z., "Theory of Cortical Plasticity," World Scientific, New Jersey (2004) (hereinafter "Cooper et al."), the entirety of which is incorporated by reference herein.)

Figure 5:
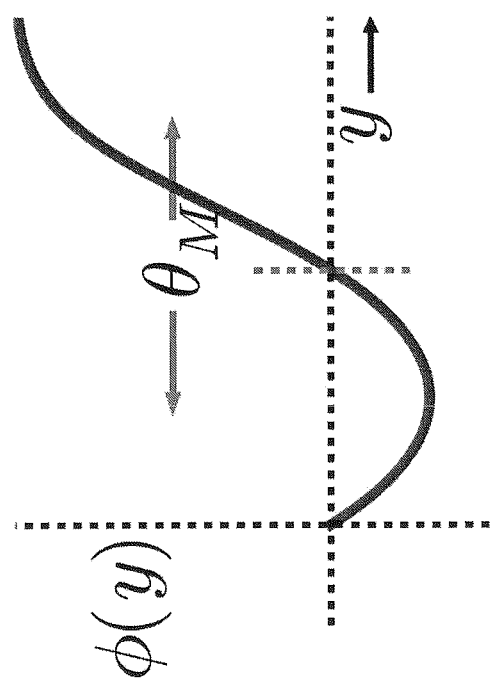
FIG. 5 is an example graphical depiction of the shape of the conventional BCM learning rule.

FIG. 5 provides a graphical depiction of a typical shape of the function $\phi$ used in the BCM learning rule. As illustrated in FIG. 5, the point at which this function $\phi$ transitions from a negative response to a positive response (i.e., the point at which the function $\Phi$ is equal to zero) occurs at the point $\theta_M$.

Despite its widespread use in neural networks, the BCM learning rule has several drawbacks. In signals where there are a large amount of unique features that are desired to be learned, certain features are more likely to be learned than others, due to their frequency of occurrence and strength of signal. While some variety of features can be learned through random initialization of the weights, this does not guarantee the ability to cover the entire scope of the desired unique features to be learned. It also does not guarantee that all post neurons won't learn the same thing. In a standard BCM learning paradigm there is no interaction between the responses of the post-synaptic neurons that are containing the learned information in relation to the signals. While lateral inhibition can be applied, it does not produce the desired learning effect to separate neural responses to unique features.

B. Competitive BCM Learning Rule In Accordance with an Embodiment of the Present Invention In an embodiment, in brain-based devices (BBD), individual neurons may be grouped into neuronal groups that share similar features—such as, persistence, firing thresholds, etc. BBDs may also include a value system that helps to modulate learning. The value system can be driven by anything of interest that might be important for modulating the learning of a particular synaptic connection. For example, the strength of a neuronal output may be used to drive the value system and therefore modulate learning. Other examples could include the strength of a group of neurons responding, or signals considered input to the system can be used to drive the value system.

Competitive learning according to an embodiment of the present invention encourages complete learning of a particular feature space. With the standard BCM learning rule, a stable response based on the movement of $\theta_M$ and change in weights can be learned which allows certain connections to be strengthened and certain connections to be weakened based upon the sequenced input. Randomizing the input allows for higher $\theta_M$ averaging and learning rates, but is not necessary. In an embodiment, the competitive BCM learning is configured to (i) strengthen the response of the neuron that responds most strongly to a current stimulus and (ii) weaken each other neuron's response to the current stimulus. As a result, the competitive BCM learning rule may remove the effects of the strengths and frequency of the stimulus that might cause all of the neurons to learn the same thing.

According to the competitive BCM rule, in an embodiment, the neuron with the maximum response to a particular stimulus learns in a typical BCM fashion; whereas weights to all other neurons are intentionally depressed. That is, the learning rule for the neuron with the maximum response is the conventional BCM learning rule (i.e., the learning rule set forth in Equation 2 above). In contrast, the learning rule for all neurons but the neuron with the maximum response is modified to replace $\theta_M$ used in the BCM learning rule with a new value. For example, the new value of $\theta_M$ may be set equal to a proportion of a neuron's response to a particular feature. That is, if the neuron's response to a particular feature is given by c, then the new value of $\theta_M$ may be set equal to $\alpha$ times c, wherein $\alpha$ is a parameter (such as, the integer value 2).

Figure 6:
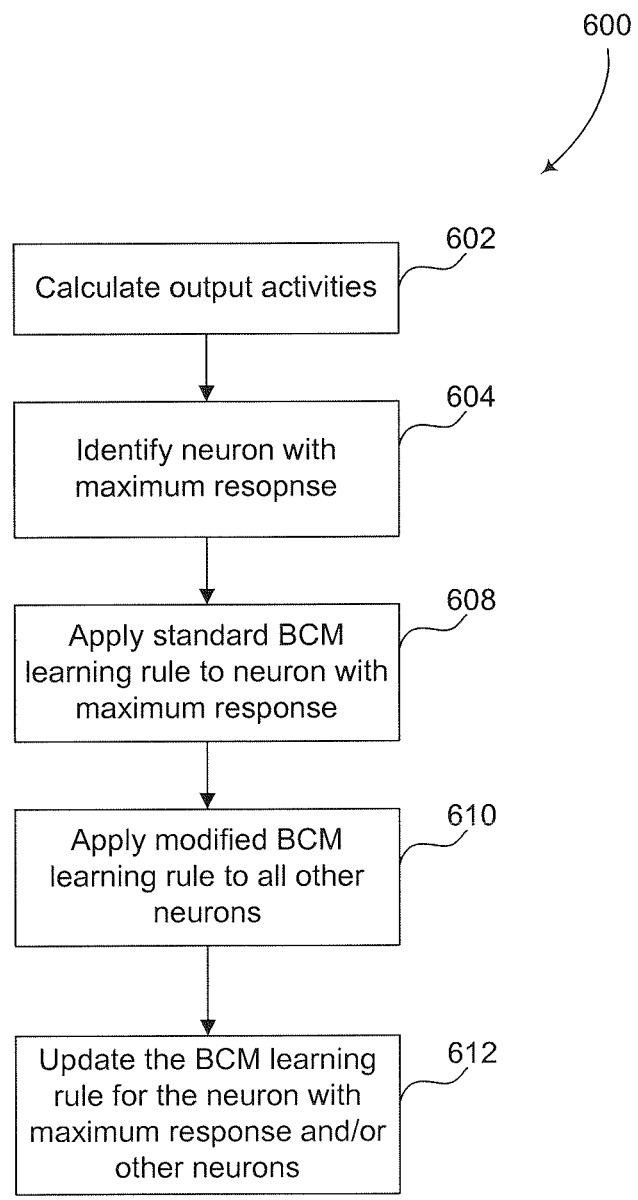
FIG. 6 is a flowchart illustrating an example method for implementing a competitive BCM learning rule in accordance with an embodiment of the present invention.

FIG. 6 is a flowchart illustrating an example method 600 for implementing a competitive BCM learning rule in accordance with an embodiment of the present invention. Referring to FIG. 6, method 600 begins at a step 602 in which output activities of all neurons associated with competitive learning group are calculated. The activity may be updated using any method known to persons of skill in the relevant art(s). An example, non-limiting method for updating the activity of neurons is disclosed in U.S. application Ser. No. 12/621,243 to Moore et al., entitled "Neural Segmentation of an Input Signal and Applications Thereof, filed Nov. 18, 2009, the entirety of which is incorporated by reference herein in its entirety.

In a step 604, the neuron with the maximum response, based on the calculated output activity of step 602, is identified.

In a step 608, the standard BCM learning rule is applied to the neuron with the maximum response. That is, the change in weight specified in Equation 2 may be applied to all connections leading to the neuron with the maximum response, identified in step 604.

In a step 610, a modified BCM learning rule is applied to all other neurons-i.e., all neurons except the neuron with the maximum response. The modified BCM learning rule is different than the standard BCM learning rule. As set forth above, in an embodiment, the standard BCM learning rule can be represented by the following equation:

$$\Delta w_i = \eta * \Phi(y, \theta_M) * x_i \quad \text{(Eq. 2)}$$

where, $\eta$ is a learning rate, and the modification threshold $\theta_M$ is defined as follows $$\theta_M = E[y^2] \quad \text{(Eq. 3)}$$

and $$\Phi(y, \theta_M) = y(y - \theta_M)\sigma'(y) \quad \text{(Eq. 4)}$$

and $E(x)$ is the expected value, and $\sigma'(x)$ is the derivative of with respect to x. In one example, the modified BCM learning rule results by replacing $\theta_M$ in Equation 2 with a larger value than the output response of a neuron. For example, if the output response of a neuron is c, then the $\theta_M$ used for calculating the new connection strength w for that neuron may be set equal to $\alpha$ times c, wherein a is a parameter (such as, but not limited to, the integer value 2; other integers or non-integers could alternatively be used, depending on the level of depression desired for each particular application).

In a step 612, the $\theta_M$ for maximally responding neuron is updated. Additionally or alternatively, $\theta_M$ can also be updated for each other neuron.

By implementing a competitive BCM learning rule in accordance with an embodiment of the present invention, each neuron in a neural network can be configured to respond to a unique feature of an input-data signal—rather than having multiple neurons respond to the same feature of the input-data signal, as may happen when implementing the conventional BCM learning rule.

VI. Conclusion

Described above is a competitive BCM learning rule and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer-implemented method for implementing an artificial neural system including an input layer configured to respond to stimulus, a set of neurons and a set of connections between the input layer and the set of neurons, the method comprising:

determining a response for individual ones of the set of neurons with respect to a feature in the stimulus, wherein the response correlates positively to a frequency of the feature in the stimulus;

comparing responses for neurons in the set of neurons with respect to the feature in the stimulus;

identifying, from the set of neurons, a maximally responding neuron, the maximally responding neuron being a neuron having a larger response to the feature in the stimulus than all other neurons in the set of neurons;

updating weights of individual connections of the maximally responding neuron according to a first learning rule, wherein the first learning rule uses a first function based on a first modification threshold;

updating weights of individual connections of the other neurons in the set of neurons according to a second learning rule, wherein the other neurons are different from the maximally responding neuron, wherein the second learning rule uses a second function based on a second modification threshold, wherein a value of the second modification threshold for a particular individual other neuron is greater than the response of the particular individual other neuron to the feature in the stimulus and the value of the second modification threshold is obtained by multiplying the response of the particular individual other neuron by a factor larger than one; and generating responses to the feature in the stimulus by the maximally responding neuron and other neurons respectively according to their respective updated weights, wherein application of the first learning rule strengthens the response of the maximally responding neuron to the feature in the stimulus and wherein application of the second learning rule weakens the response of the other neurons to the feature in the stimulus.

2. A computing system for implementing an artificial neural system, the system comprising:

a neural network, comprising:

an input layer configured to respond to stimulus;

a set of neurons including output neurons;

a set of connections between the input layer and the set of neurons, wherein values of individual connections represent weights;

a memory configured to store the set of neurons; and a processing unit configured to determine a response for individual ones of the set of neurons with respect to a feature in the stimulus, wherein the response correlates positively to a frequency of the feature in the stimulus;

compare responses for neurons in the set of neurons with respect to the feature in the stimulus;

identify, from the set of neurons, a maximally responding neuron, the maximally responding neuron being a neuron having a larger response to the feature in the stimulus than all other neurons in the set of neurons;

update weights of individual connections of the maximally responding neuron according to a first learning rule, wherein the first learning rule uses a first function based on a first modification threshold;

update weights of individual connections of the other neurons in the set of neurons according to a second learning rule, wherein the other neurons are different from the maximally responding neuron, wherein the second learning rule uses a second function based on a second modification threshold, and wherein a value of the second modification threshold for a particular individual other neuron is greater than the response of the particular individual other neuron to the feature in the stimulus and the value of the second modification threshold is obtained by multiplying the response of the particular individual other neuron by a factor larger than one;

generate responses to the feature in the stimulus by the maximally responding neuron and other neurons respectively according to their respective updated weights, wherein application of the first learning rule strengthens the response of the maximally responding neuron to the feature in the stimulus; and wherein application of the second learning rule to weakens the response of the other neurons to the feature in the stimulus.

3. A non-transitory machine-readable medium that stores instructions, which, when executed by a computer processor, cause the computer processor to perform a computer-implemented method for implementing an artificial neural system including an input layer configured to respond to stimulus, a set of neurons and a set of connections between the input layer and the set of neurons, the method comprising:

determining a response for individual ones of the set of neurons with respect to a feature in the stimulus, wherein the response correlates positively to a frequency of the feature in the stimulus;

comparing responses for neurons in the set of neurons with respect to the feature in the stimulus;

identifying, from the set of neurons, a maximally responding neuron, the maximally responding neuron being a neuron having a larger response to the feature in the stimulus than all other neurons in the set of neurons;

updating weights of individual connections of the maximally responding neuron according to a first learning rule, wherein the first learning rule uses a first function based on a first modification threshold;

updating weights of individual connections of the other neurons in the set of neurons according to a second learning rule, wherein the other neurons are different from the maximally responding neuron, wherein the second learning rule uses a second function based on a second modification threshold, wherein a value of the second modification threshold for a particular individual other neuron is greater than the response of the particular individual other neuron to the feature in the stimulus and the value of the second modification threshold is obtained by multiplying the response of the particular individual other neuron by a factor larger than one; and generating responses to the feature in the stimulus by the maximally responding neuron and other neurons respectively according to their respective updated weights, wherein application of the first learning rule strengthens the response of the maximally responding neuron to the feature in the stimulus and wherein application of the second learning rule weakens the response of the other neurons to the feature in the stimulus.

4. The non-transitory machine-readable medium of claim 3, wherein the factor is an integer value two (2).

5. The non-transitory machine-readable medium of claim 3, wherein the factor is determined depending on a level of depression desired for each particular application.

6. The non-transitory machine-readable medium of claim 3, wherein the method further comprises generating different neural responses by the set of neurons to different features of the stimulus, wherein application of the first and second learning rules facilitates each neuron of the set of neurons to respond to a unique feature of the stimulus.

7. The computer-implemented method of claim 1, wherein the factor is an integer value two (2).

8. The computer-implemented method of claim 1, wherein the factor is determined depending on a level of depression desired for each particular application.

9. The computer-implemented method of claim 1, further comprising generating different neural responses by the set of neurons to different features of the stimulus, wherein application of the first and second learning rules facilitates each neuron of the set of neurons to respond to a unique feature of the stimulus.

10. The computing system of claim 2, wherein the factor is an integer value two (2).

11. The computing system of claim 2, wherein the factor is determined depending on a level of depression desired for each particular application.

12. The computing system of claim 2, wherein the processing unit is further configured to generate different neural responses by the set of neurons to different features, wherein application of the first and second learning rules facilitates each neuron of the set of neurons to respond to a unique feature of the stimulus.

* * * * *